United States Patent
Sobel et al.

(10) Patent No.: US 8,996,875 B1
(45) Date of Patent: Mar. 31, 2015

(54) DETECTING MALWARE SIGNED WITH MULTIPLE CREDENTIALS

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 847 days.

(21) Appl. No.: 12/882,882

(22) Filed: Sep. 15, 2010

(51) Int. Cl.
*G06F 21/00* (2013.01)
*G06F 21/56* (2013.01)

(52) U.S. Cl.
CPC .................................... *G06F 21/566* (2013.01)
USPC ............................................. 713/176; 726/23

(58) Field of Classification Search
CPC ......... G06F 21/00; G06F 21/22; G06F 21/51; G06F 21/55; G06F 21/56; G06F 21/566
See application file for complete search history.

(56) References Cited

U.S. PATENT DOCUMENTS

| | | | |
|---|---|---|---|
| 2003/0204592 A1* | 10/2003 | Crouse-Kemp et al. | 709/225 |
| 2006/0212930 A1* | 9/2006 | Shull et al. | 726/10 |
| 2007/0260651 A1* | 11/2007 | Pedersen | 707/204 |
| 2008/0298581 A1* | 12/2008 | Murase et al. | 380/44 |
| 2010/0005291 A1* | 1/2010 | Hulten et al. | 713/156 |

OTHER PUBLICATIONS

F-Secure Document; Jarno Niemala; May 6, 2010.

* cited by examiner

*Primary Examiner* — Shewaye Gelagay
*Assistant Examiner* — Carlton Johnson
(74) *Attorney, Agent, or Firm* — Brill Law Office; Jeffrey Brill

(57) ABSTRACT

Malware that is signed with multiple, valid credentials is detected. A central computer such as a server receives secure hashes of signed application bodies and immutable portions of corresponding digital signatures for a plurality of signed applications from a plurality of client computers. Received secure hashes of signed application bodies are compared. Multiple instances of a single signed application are identified based on the comparing of multiple received secure hashes of signed application bodies. Responsive to identifying multiple instances of the single signed application, received secure hashes of immutable portions of digital signatures corresponding to identified multiple instances of the single signed application are compared. Responsive to the results of this comparing, a potential maliciousness of the signed application is adjudicated.

17 Claims, 5 Drawing Sheets

DETECTING MALWARE SIGNED WITH MULTIPLE CREDENTIALS

TECHNICAL FIELD

This disclosure pertains generally to computer security, and more specifically to detecting malware that is signed with multiple, valid credentials.

BACKGROUND

Computer users have been taught that software is legitimate if has been signed with credentials from a valid signing authority, and therefore users have come to trust such signed software. Unfortunately, a new type of malware takes advantage of this trust by obtaining signing credentials (e.g., a key set) from one or more valid authorities under multiple company names. The malicious party then signs and distributes their malicious software application. Because the malicious application is signed with valid credentials, it is likely to be trusted. In due course it will be realized that the software application is malicious, and the signing authority will revoke the associated credentials. At this point, the malicious party uses another credential set, acquired under a different company name, to sign the same malicious application. These credentials will also be revoked in time, but at that point the malicious party will sign the application with yet another set. By employing this strategy, the malicious party can continue distributing the malicious application with a valid signature, even as multiple credential sets are revoked by signing authorities.

Because the signing authority is unaware that the multiple companies are being used by the same malicious party to obtain multiple credential sets to sign the same malicious program, the signing authority only revokes one credential set at a time, as it learns that the specific credential set is being used to sign malware. In some instances, the malicious party creates multiple companies each of which acquire valid signing credentials at the same time. In other instances, the malicious party frequently changes their company name, and continues to acquire new signing credentials under each new company name over a period of time.

The approach of signing the same or similar malware with multiple signing credentials is frequently used by riskware and other likely unwanted programs, as well as by fake anti-virus applications. For example, the application "Perfect Defender" is signed with credentials under the multiple names Jeansovi LLC, Perfect Software LLC, Sovinsky LLC and Trambambon LLC. Because each signature is valid, malware signed and distributed under this scheme tends to be trusted by users. It would be desirable to address these issues.

SUMMARY

Malware that is signed with multiple, valid credentials is detected. Each of a plurality of client computers identifies local signed applications. Secure hashes of application bodies of identified signed applications are created. Additionally, secure hashes of immutable portions of corresponding digital signatures of identified signed applications are created. The created secure hashes are transmitted by each of the plurality of client computers to a central computer such as a server. The central computer receives the secure hashes of signed application bodies and immutable portions of corresponding digital signatures for a plurality of signed applications from the plurality of client computers. Received secure hashes of signed application bodies are compared. Multiple instances of a single signed application are identified based on the comparing of multiple received secure hashes of signed application bodies. In some embodiments, such an identification is made responsive to multiple received secure hashes of signed application bodies being identical, whereas in other embodiments the identification is made responsive to multiple received secure hashes of signed application bodies being similar within a predetermined margin of acceptance. Responsive to identifying multiple instances of the single signed application, received secure hashes of immutable portions of digital signatures corresponding to identified multiple instances of the single signed application are compared. Responsive to the results of this comparing, a potential maliciousness of the signed application is adjudicated. More specifically, responsive to the received secure hashes of immutable portions of the digital signatures matching, the signed application can be adjudicated to be benign. Responsive to the received secure hashes of immutable portions of the digital signatures not matching, the signed application can be adjudicated to be malicious. The received secure hashes of immutable portions of the digital signatures not matching can also be treated as one piece of evidence of the signed application being malicious, and/or can be used to lower a reputational score of the signed application.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
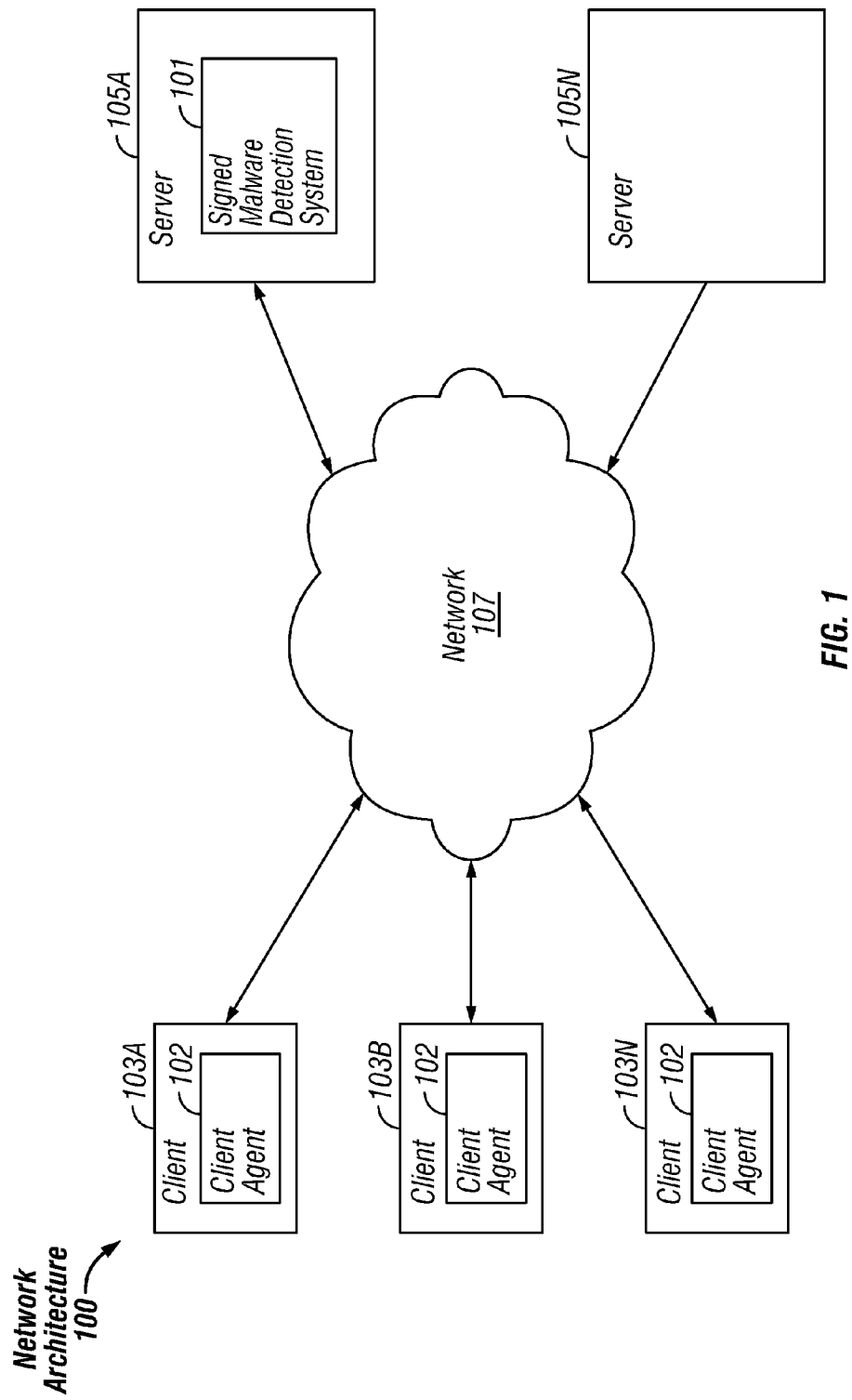
FIG. 1 is a block diagram of an exemplary network architecture in which a signed malware detection system can be implemented, according to some embodiments.

FIG. 1 is a block diagram illustrating an exemplary network architecture 100 in which a signed malware detection system 101 can be implemented. The illustrated network architecture 100 comprises multiple clients 103A, 103B and 103N, as well as multiple servers 105A and 105N. In FIG. 1, the signed malware detection system 101 is illustrated as residing on server 105A, with a client agent 102 thereof on each client. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
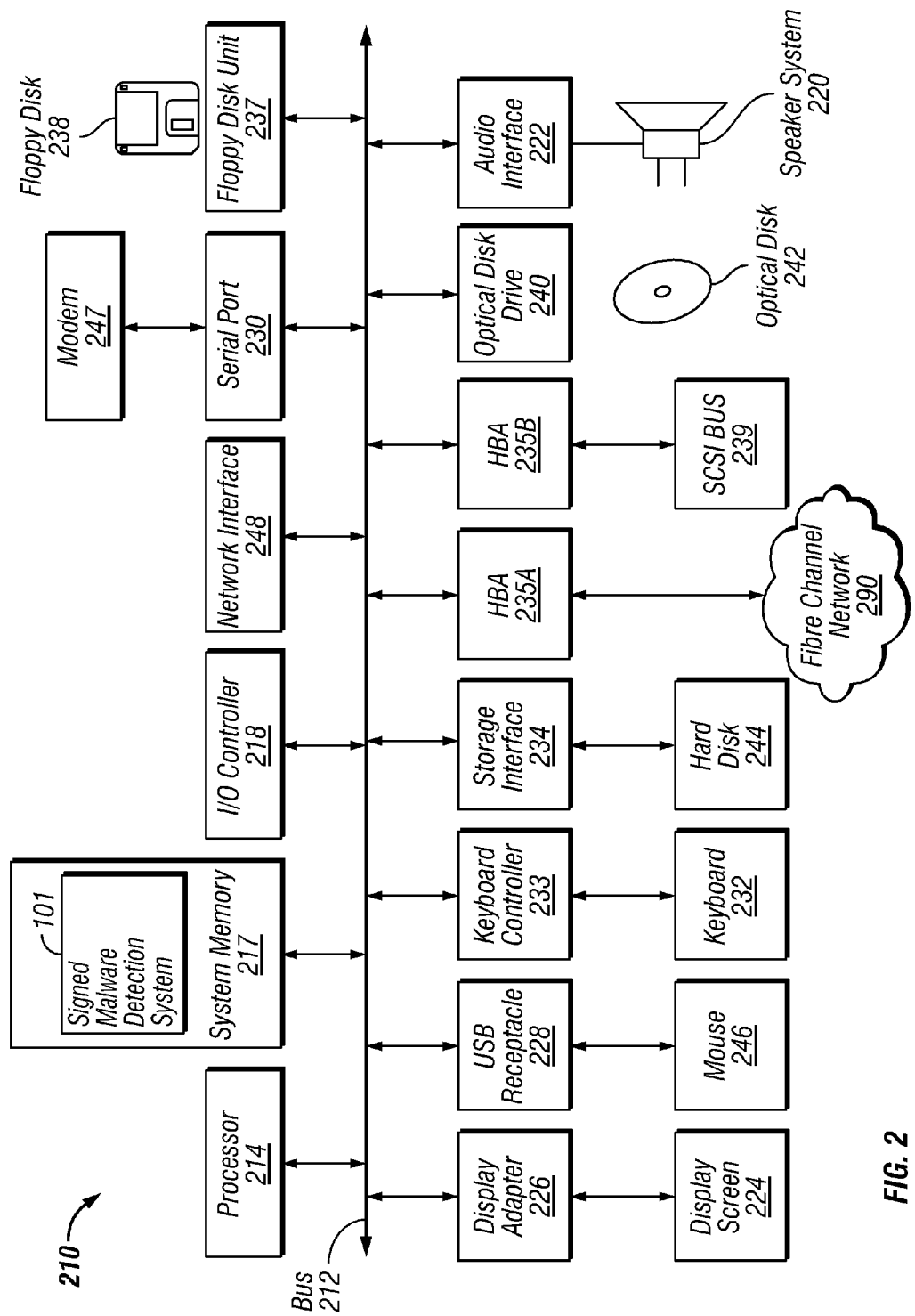
FIG. 2 is a block diagram of a computer system suitable for implementing a signed malware detection system, according to some embodiments.

FIG. 2 is a block diagram of a computer system 210 suitable for implementing a signed malware detection system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the signed malware detection system 101 is illustrated as residing in system memory 217. The workings of the signed malware detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
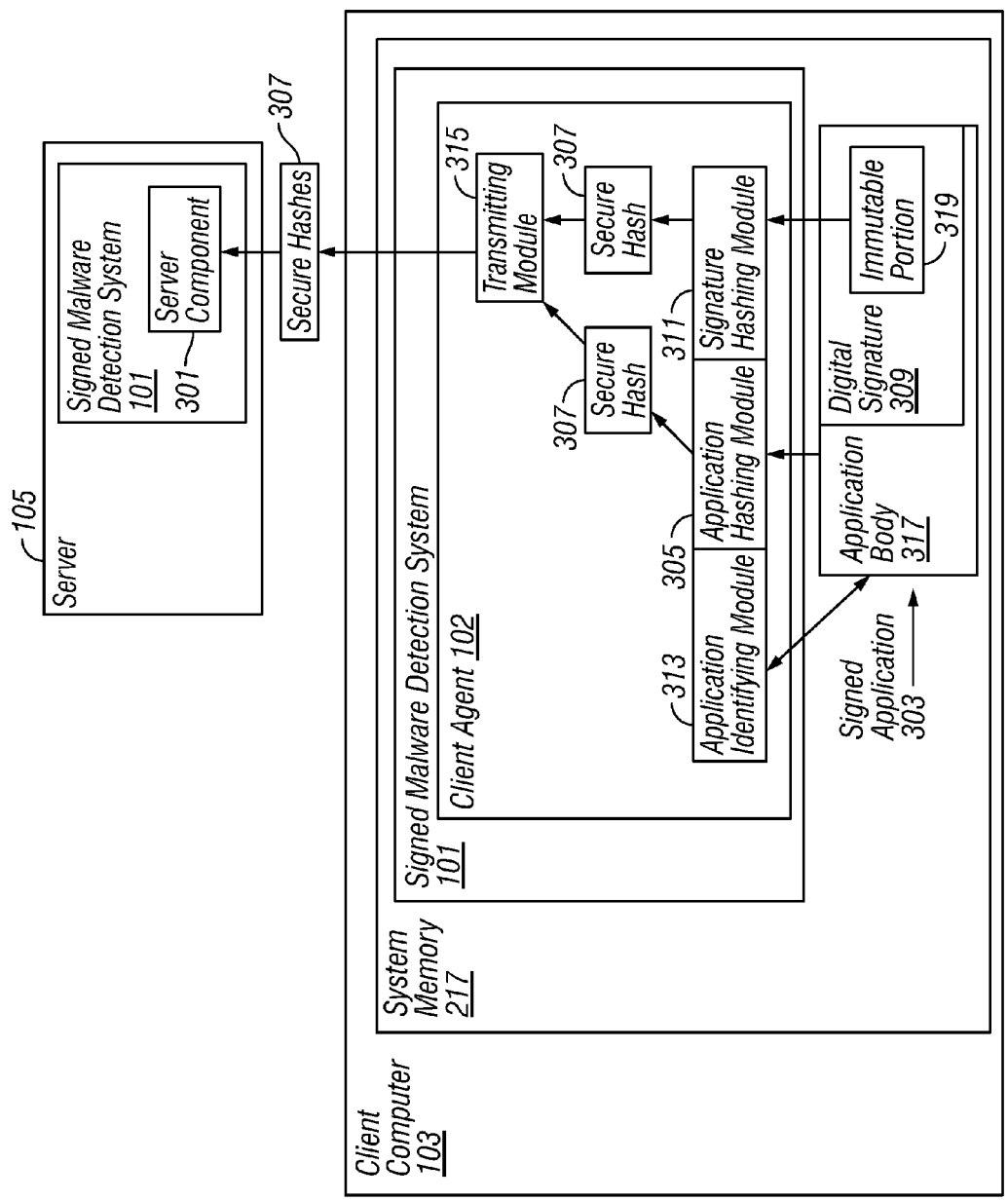
FIG. 3 is a block diagram of the operation of a client agent of a signed malware detection system, according to some embodiments.
Figure 4:
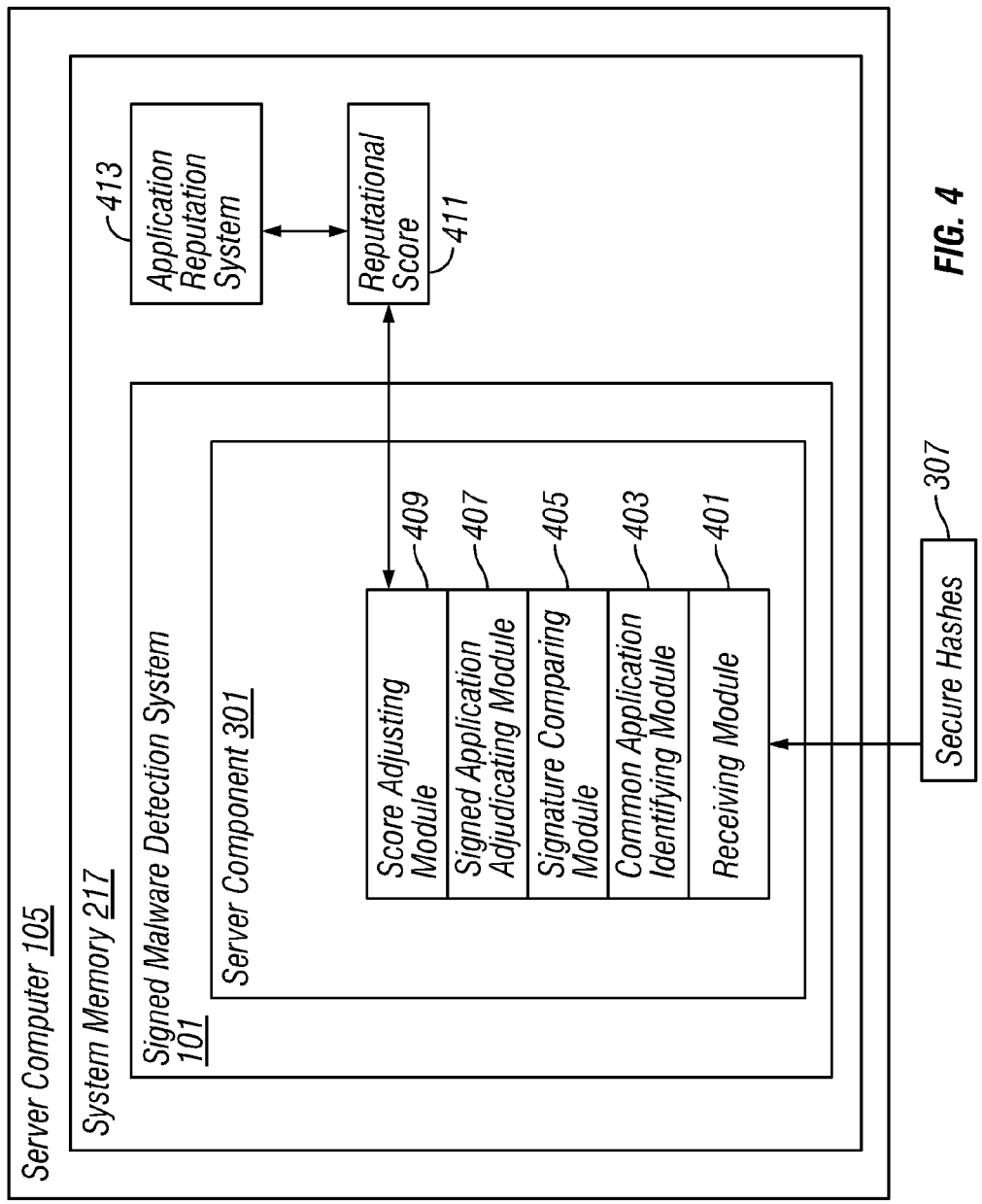
FIG. 4 is a block diagram of the operation of a server component of a signed malware detection system, according to some embodiments.

FIG. 3 illustrates the operation of a client agent 102 of the signed malware detection system 101, residing in the system memory 217 of a computer system 210 according to some embodiments. As described above, the functionalities of the signed malware detection system 101 including those of the client agent 102 can reside on a client 103, a server 105, or be distributed between multiple computer systems 210, including within a cloud-based computing environment in which the functionality of the signed malware detection system 101 is provided as a service over a network 107. It is to be understood that although the signed malware detection system 101 is illustrated in FIGS. 3 and 4 as a single entity, the illustrated signed malware detection system 101 represents a collection of functionalities, which can be instantiated as a single or multiple modules as desired (an instantiation of specific, multiple modules of the signed malware detection system 101 is illustrated in FIGS. 3 and 4). It is to be understood that the modules of the signed malware detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the signed malware detection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In order to detect malware that can be identified by its use of multiple, valid signing credentials, the signed malware detection system 101 detects signed applications 303 which are identical or very similar, except that they have been signed by different signing credentials. To do so, as illustrated, a client agent 102 of the signed malware detection system 101 runs in the system memory 217 of a client 103. A signed application identifying module 313 of the client agent 102 identifies signed applications 303 on the client 103. A single client agent 102 running on a single client 103 is illustrated in FIG. 3, but it is to be understood that in practice many clients 103 each running a client agent 102 would typically be deployed.

An application hashing module 305 of the client agent 102 creates secure hashes 307 of signed applications 303 on the client 103. However, rather than simply creating a secure hash 307 of an entire signed application 303, the application hashing module 305 creates a secure hash 307 of the portion of the signed application 303 which does not include the digital signature 309 (this portion is hereafter referred to as the application body 317). In different embodiments, the application hashing module 305 uses different implementation mechanics for this purpose. In one embodiment, the application hashing module 305 employs a straight secure hash of the application body 317, whereas in other embodiments the application hashing module 305 uses format aware hashes such as verhash or ultrahash.

Separately, a signature hashing module 311 of the client agent 102 creates a secure hash 307 of those portions 319 of the digital signatures 309 of the signed applications 303 on the client 103 which are typically immutable (such as the company name), ignoring fields of the digital signatures 309 expected to change over time, such as the signing date or certificate expiration date. In different embodiments, different portions of a digital signature 309 can be considered to be immutable portions 319, with the idea being that these are portions expected to remain the same over time under legitimate circumstances (e.g., company name or certificate holder related fields), whereas other portions are expected to change (e.g., date related fields). As with the application hashing module 305, the signature hashing module 311 can use different hashing mechanisms to create its secure hashes 307 in different embodiments.

A transmitting module 315 of the client agent 102 then transmits these two secure hashes 307 as a pair (the secure hash 307 of the body 317 of a specific signed application 303 and the secure hash 307 of the immutable portions 319 of the digital signature 309 of that same signed application 303) to a server component 301 of the signed malware detection system 101, where they are processed as described below in conjunction with FIG. 4.

As illustrated in FIG. 4, the server component 301 of the signed malware detection system 101 runs in the system memory 217 of a server computer 105, and receives pairs of secure hashes 307 of the type described above from a large plurality of clients 103 (the large plurality of clients 103 is not illustrated in FIG. 4). In other embodiments, the functionality of the server component 301 of the signed malware detection system 101 is distributed between multiple computing systems 210. In any case, a receiving module 401 of the server component 301 receives pairs of secures hashes 307 of signed application bodies 317 and immutable portions 319 of the corresponding digital signatures 309. Because the server component 301 of the of the signed malware detection system 101 receives such secure hash 307 pairs from a large base of clients 103, it is able to analyze a large sample of signed applications 303 and their digital signatures 309 received from a variety of sources over time. A common application identifying module 403 of the server component 301 compares multiple secure hashes 307 of signed application bodies 317 received from multiple clients 103 and/or at multiple times, and identifies multiple instances of the same signed application 303. How close of a match between secure hashes 307 of signed application bodies 317 results in the common application identifying module 403 classifying two instances as the same signed application 303 is a variable design parameter. In some embodiments an exact or very near match between secure hashes 307 is required, whereas in other embodiments varying levels of difference are considered to be within a predetermined margin of acceptance to account for, e.g., changes between versions or modifications made intentionally to the application 303 by the malicious party.

Responsive to the common application identifying module 403 identifying multiple instances of the same signed application 303 based on comparing the secure hashes 307 of the application bodies 317, a signature comparing module 405 of the server component 301 determines whether the corresponding immutable portions 319 of the digital signatures 309 match, by comparing the corresponding secure hashes 307 thereof. Based on whether the immutable portions 319 match as determined by comparing the secure hashes 307 of the immutable portions 319 of the digital signatures 309, a signed application adjudicating module 407 of the server component 301 makes a potential maliciousness adjudication concerning the signed application 303. If the immutable portions 319 of the digital signatures 309 match, then the signed application adjudicating module 407 determines that the multiple versions of the signed application 303 have been signed with the same credentials, and therefore adjudicates the signed application 303 as being benign. In this case, no further action is necessary.

Where the immutable portions 319 of the digital signatures 309 do not match, the signed application adjudicating module 407 determines that the multiple versions of the signed application 303 have been signed with different credentials, and adjudicates that there is at least a possibility of the signed application 303 being malicious. How suspicious this is considered to be and what specific actions are taken in response is a variable design parameter. In one embodiment, responsive to the determining that the immutable portions 319 of the digital signatures 309 do not match, the signed application adjudicating module 407 adjudicates the signed application 303 as being malicious. In other embodiments, the signed application adjudicating module 407 treats this as evidence of the signed application 303 being malicious, which the signed application adjudicating module 407 weighs in conjunction with other evidence to make a maliciousness determination. For example, identifying a single signed application 303 signed with five different credential sets within a single week would likely result in an adjudication of the signed application 303 being malicious, whereas identifying two different credential sets over a six month period might not result in such an adjudication. How strongly to weigh given evidence in the maliciousness adjudication of signed applications 303 is a variable design parameter.

In some embodiments, the maliciousness adjudication of signed applications 303 is made within the context of an application reputation system 413, and non-matching immutable portions 319 of the digital signatures 309 for multiple instances of a signed application 303 are used by a score adjusting module 409 of the server component 301 to lower a reputational score 411 of the signed application 303. How much to lower the reputational score 411 based upon such determinations is a variable design parameter. In such embodiments, the reputational score 411 can also be adjusted up and down according to conventional factors such as the reputation of the software publisher, length of time the application 303 has been in distribution, reported problems with the application 303, etc. In these embodiments, only when the reputational score 411 reaches a given threshold does the signed application adjudicating module 407 adjudicate the signed application 303 as being malicious. What value to use for the threshold is a variable design parameter. Note also that the detection of a single application 303 signed with multiple credential sets is only one factor involved in the calculation of the reputational score 411.

Figure 5:
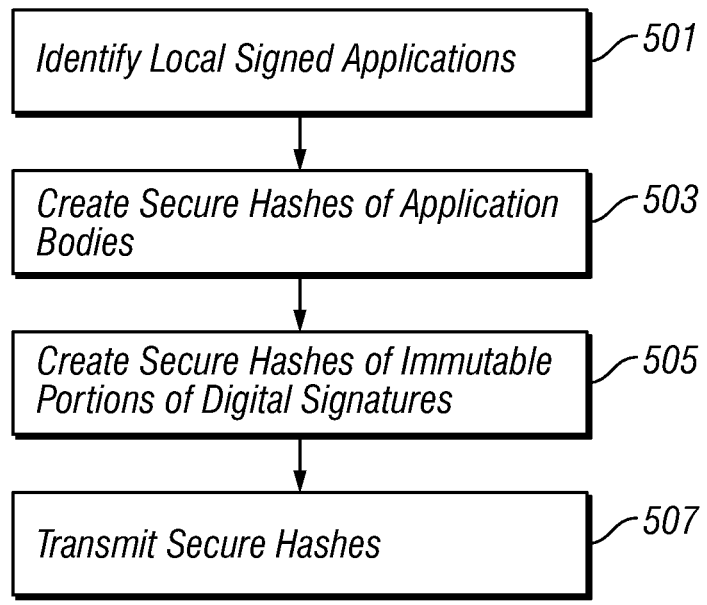
FIG. 5 is a flowchart of the client side operation of a signed malware detection system, according to some embodiments.

FIG. 5 illustrates the client side operation of a signed malware detection system 101 (FIG. 1), according to some embodiments. On each of a plurality of client computers 103 (FIG. 1), a signed application identifying module 313 (FIG. 3) of a client agent 102 (FIG. 1) identifies 501 local signed applications 303 (FIG. 3) on that client computer 103 (FIG.

1). For each identified signed application 303 (FIG. 3), an application hashing module 305 (FIG. 3) of the client agent 102 (FIG. 1) creates 503 a secure hash 307 (FIG. 3) of the application body 317 (FIG. 3) of the signed application 303 (FIG. 3), and a signature hashing module 311 (FIG. 3) of the client agent 102 (FIG. 1) creates 505 a secure hash 307 (FIG. 3) of the immutable portions 319 (FIG. 3) of the digital signature 309 (FIG. 3). A transmitting module 315 (FIG. 3) of the client agent transmits 507 the created secure hashes 307 (FIG. 3) to a server component 301 (FIG. 3) of the signed malware detection system 101 (FIG. 1).

Figure 6:
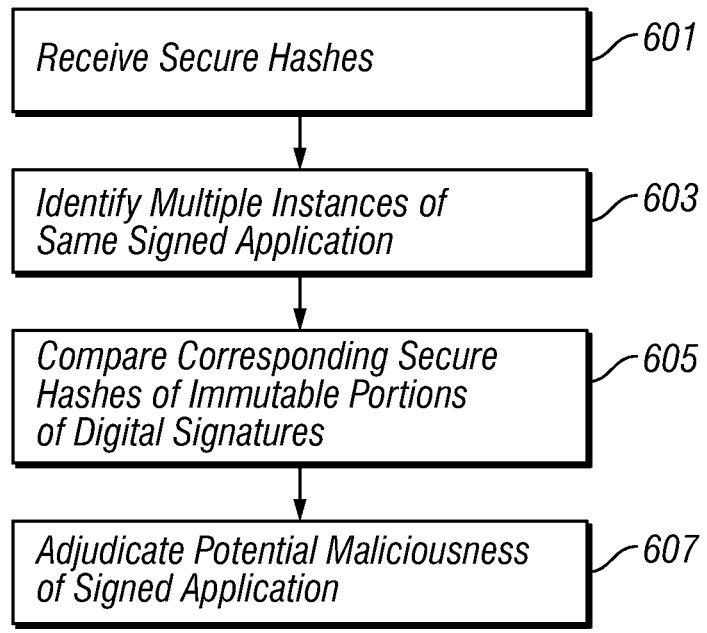
FIG. 6 is a flowchart of the server side operation of a signed malware detection system, according to some embodiments.

FIG. 6 illustrates the server side operation of a signed malware detection system 101 (FIG. 1), according to some embodiments. A receiving module 401 (FIG. 4) of the server component 301 (FIG. 3) receives 601 secure hashes 307 (FIG. 3) of application bodies 317 (FIG. 3) of signed applications 303 (FIG. 3) and corresponding secure hashes 307 (FIG. 3) of the immutable portions 319 (FIG. 3) of digital signatures 309 (FIG. 3) of these signed applications 303 (FIG. 3). A common application identifying module 403 (FIG. 4) of the server component 301 (FIG. 3) identifies 603 multiple instances of the same signed application 303 (FIG. 3) by comparing multiple secure hashes 307 (FIG. 3) of signed application bodies 317 (FIG. 3). A signature comparing module 405 (FIG. 4) of the server component 301 compares 605 the corresponding secure hashes 307 (FIG. 3) of the immutable portions 319 (FIG. 3) of the digital signatures 309 (FIG. 3) of multiple instances of the same signed application 303 (FIG. 3), to determine whether the immutable portions 319 (FIG. 3) match. Based on whether the immutable portions 319 (FIG. 3) match, a signed application adjudicating module 407 (FIG. 4) of the server component 301 (FIG. 3) adjudicates 607 potential maliciousness of the signed application 303 (FIG. 3).

As will be understood by those familiar with the art, the invention may be embodied in other specific forms without departing from the spirit or essential characteristics thereof. Likewise, the particular naming and division of the portions, modules, agents, managers components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting malware that is signed with multiple, valid credentials, the method comprising the steps of:
   receiving, by at least one computer, pairs of secure hashes corresponding to a plurality of different signed applications from a plurality of client computers, wherein each received pair of secure hashes comprises a secure hash of a body of a specific signed application and a secure hash of an immutable portion of a digital signature with which the specific application is signed;
   comparing, by the at least one computer, secure hashes of signed application bodies received from the plurality of client computers with each other;
   identifying, by the at least one computer, multiple instances of a single signed application from among the plurality of different signed applications, based on comparing multiple received secure hashes of signed application bodies with each other;
   responsive to identifying multiple instances of the single signed application, comparing with each other, by the at least one computer, received secure hashes of immutable portions of digital signatures with which the identified multiple instances of the single application are signed;
   determining that identified multiple instances of the same application body have been signed with multiple signatures with different immutable portions, responsive to results of comparing, with each other received secure hashes of immutable portions of digital signatures with which the identified multiple instances of the single application are signed; and
   adjudicating, by the at least one computer, potential maliciousness of the signed application responsive to determining that the identified multiple instances of the same application body have been signed with multiple signatures with different immutable portions, wherein adjudicating, by the at least one computer, potential maliciousness of the signed application comprises, responsive to the received secure hashes of immutable portions of digital signatures corresponding to identified multiple instances of the single signed application not matching;
      treating, by the at least one computer, the non-matching of the received secure hashes of immutable portions of digital signatures corresponding to identified multiple instances of the single signed application as evidence of the signed application being malicious.

2. The method of claim 1 wherein identifying, by the at least one computer, multiple instances of a single signed application, based on comparing multiple received secure hashes of signed application bodies further comprises:
   identifying, by the at least one computer, multiple instances of a single signed application, responsive to multiple received secure hashes of signed application bodies being identical.

3. The method of claim 1 wherein identifying, by the at least one computer, multiple instances of a single signed application, based on comparing multiple received secure hashes of signed application bodies further comprises:
   identifying, by the at least one computer, multiple instances of a single signed application, responsive to multiple received secure hashes of signed application bodies being similar within a predetermined margin of acceptance.

4. The method of claim 1, further comprising:
   responsive to the received secure hashes of immutable portions of digital signatures corresponding to identified multiple instances of the single signed application matching, adjudicating, by the at least one computer, that the signed application is benign.

5. The method of claim 1, further comprising:
   responsive to the received secure hashes of immutable portions of digital signatures corresponding to identified multiple instances of the single signed application not matching, adjudicating, by the at least one computer, that the signed application is malicious.

6. The method of claim 1, further comprising:
   responsive to the received secure hashes of immutable portions of digital signatures corresponding to identified multiple instances of the single signed application not matching, lowering, by the at least one computer, a reputational score of the signed application.

7. The method of claim 6 further comprising:
responsive to the reputational score of the signed application reaching a given threshold, adjudicating, by the at least one computer, that the signed application is malicious.

8. The method of claim 1 further comprising:
identifying, by at least one client computer, signed applications on the at least one client computer;
creating, by the at least one client computer, secure hashes of application bodies of signed applications identified on the at least one client computer;
creating, by the at least one client computer, secure hashes of immutable portions of corresponding digital signatures of signed applications identified on the at least one client computer; and
transmitting, by the at least one client computer, the created secure hashes to a server computer.

9. At least one non-transitory computer readable storage medium storing a computer program product for detecting malware that is signed with multiple, valid credentials, the computer program product comprising:
program code for receiving pairs of secure hashes corresponding to a plurality of different signed applications from a plurality of client computers, wherein each received pair of secure hashes comprises a secure hash of a body of a specific signed application and a secure hash of an immutable portion of a digital signature with which the specific application is signed;
program code for comparing secure hashes of signed application bodies received from the plurality of client computers with each other;
program code for identifying multiple instances of a single signed application from among the plurality of different signed applications, based on comparing multiple received secure hashes of signed application bodies with each other;
program code for, responsive to identifying multiple instances of the single signed application, comparing, with each other, received secure hashes of immutable portions of digital signatures with which the identified multiple instances of the single application are signed;
program code for determining that identified multiple instances of the same application body have been signed with multiple signatures with different immutable portions, responsive to results of comparing, with each other received secure hashes of immutable portions of digital signatures with which the identified multiple instances of the single application are signed; and
program code for adjudicating potential maliciousness of the signed application responsive to determining that the identified multiple instances of the same application body have been signed with multiple signatures with different immutable portions, wherein the program code for adjudicating potential maliciousness of the signed application comprises program code for, responsive to the received secure hashes of immutable portions of digital signatures corresponding to identified multiple instances of the single signed application not matching:
treating the non-matching of the received secure hashes of immutable portions of digital signatures corresponding to identified multiple instances of the single signed application as evidence of the signed application being malicious.

10. The computer program product of claim 9 wherein the program code for identifying multiple instances of a single signed application, based on comparing multiple received secure hashes of signed application bodies further comprises:
program code for identifying multiple instances of a single signed application, responsive to multiple received secure hashes of signed application bodies being identical.

11. The computer program product of claim 9 wherein the program code for identifying multiple instances of a single signed application, based on comparing multiple received secure hashes of signed application bodies further comprises:
program code for identifying multiple instances of a single signed application, responsive to multiple received secure hashes of signed application bodies being similar within a predetermined margin of acceptance.

12. The computer program product of claim 9, further comprising:
program code for, responsive to the received secure hashes of immutable portions of digital signatures corresponding to identified multiple instances of the single signed application matching, adjudicating that the signed application is benign.

13. The computer program product of claim 9, further comprising:
program code for, responsive to the received secure hashes of immutable portions of digital signatures corresponding to identified multiple instances of the single signed application not matching, adjudicating that the signed application is malicious.

14. The computer program product of claim 9, further comprising:
program code for, responsive to the received secure hashes of immutable portions of digital signatures corresponding to identified multiple instances of the single signed application not matching, lowering a reputational score of the signed application.

15. The computer program product of claim 14 further comprising:
program code for, responsive to the reputational score of the signed application reaching a given threshold, adjudicating that the signed application is malicious.

16. The computer program product of claim 9 further comprising:
program code for identifying, by at least one client computer, signed applications on the at least one client computer;
program code for creating, by the at least one client computer, secure hashes of application bodies of signed applications identified on the at least one client computer;
program code for creating, by the at least one client computer, secure hashes of immutable portions of corresponding digital signatures of signed applications identified on the at least one client computer; and
program code for transmitting, by the at least one client computer, the created secure hashes to a server computer.

17. A computer system for detecting malware that is signed with multiple, valid credentials, the computer system comprising:
a processor;
system memory;
a receiving module residing in the system memory, the receiving module being programmed to receive pairs of secure hashes corresponding to a plurality of different signed applications from a plurality of client computers, wherein each received pair of secure hashes comprises a secure hash of a body of a specific signed application and a secure hash of an immutable portion of a digital signature with which the specific application is signed;

a common application identifying module residing in the system memory, the common application identifying module being programmed to compare secure hashes of signed application bodies received from the plurality of client computers with each other and to identify multiple instances of a single signed application from among the plurality of different signed applications, based on comparing multiple received secure hashes of signed application bodies with each other;

a signature comparing module residing in the system memory, the signature comparing module being programmed to compare, with each other, received secure hashes of immutable portions of digital signatures with which the identified multiple instances of the single application are signed, responsive to identifying multiple instances of the single signed application;

wherein the signature comparing module is further programmed to determine that identified multiple instances of the same application body have been signed with multiple signatures with different immutable portions, responsive to results of comparing, with each other, received secure hashes of immutable portions of digital signatures with which the identified multiple instances of the single application are signed; and a signed application adjudicating module residing in the system memory, the signed application adjudicating module being programmed to adjudicate potential maliciousness of the signed application responsive to determining that the identified multiple instances of the same application body have been signed with multiple signatures with different immutable portions wherein program code for adjudicating potential maliciousness of the signed application responsive to determining that the identified multiple instances of the same application body have been signed with multiple signatures with different immutable portions, wherein adjudicating potential maliciousness of the signed application comprises, responsive to the received secure hashes of immutable portions of digital signatures corresponding to identified multiple instances of the single signed application not matching:

treating the non-matching of the received secure hashes of immutable portions of digital signatures corresponding to identified multiple instances of the single signed application as evidence of the signed application being malicious.

* * * * *